(No Model.)

B. G. WORK.
VELOCIPEDE TIRE.

No. 537,137. Patented Apr. 9, 1895.

Witnesses:
Chas. E. Gaylord
Lute J. Alter

Inventor.
Bertram G. Work,
By Dyrenforth & Dyrenforth,
Att'ys.

UNITED STATES PATENT OFFICE.

BERTRAM G. WORK, OF AKRON, OHIO.

VELOCIPEDE-TIRE.

SPECIFICATION forming part of Letters Patent No. 537,137, dated April 9, 1895.

Application filed January 3, 1895. Serial No. 533,693. (No model.)

*To all whom it may concern:*

Be it known that I, BERTRAM G. WORK, a citizen of the United States, residing at Akron, in the county of Summit and State of Ohio, have invented a new and useful Improvement in Velocipede-Tires, of which the following is a specification.

My invention relates to an improvement for use with pneumatic vehicle tires; and it relates particularly to the so-called outer-casing, cover or sheath for a pneumatic tire and to the manner of fastening it to the rim of a wheel.

My object is to provide for conveniently and securely fastening the tire-cover to the rim by means, the effectiveness of which, in their purpose, shall in no way be dependent on the inner air-tube or the inflated condition thereof.

Figure 1:
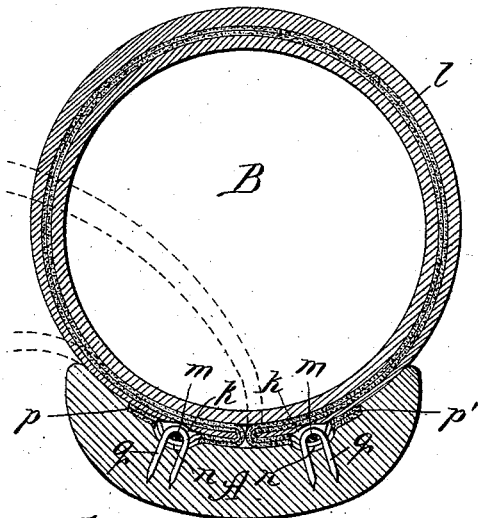
Figure 2:
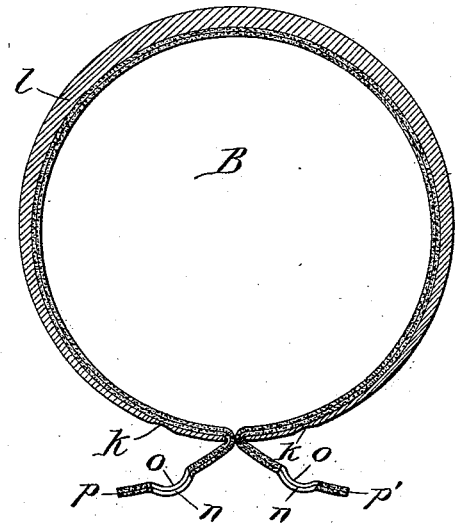
Figure 4:
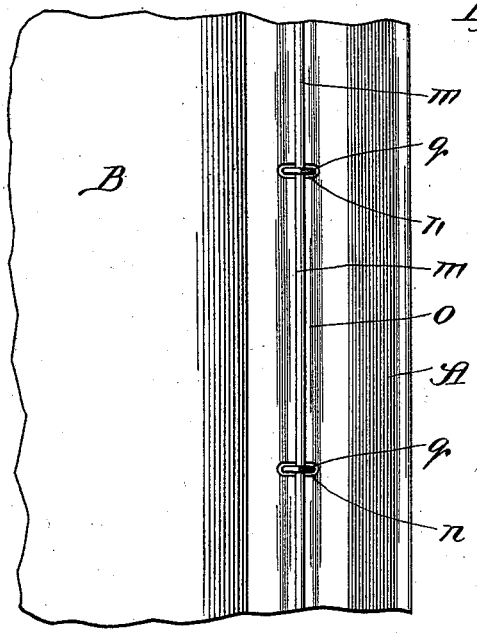
Figure 3:
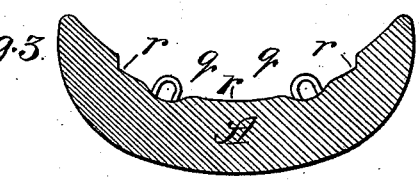
Figure 5:
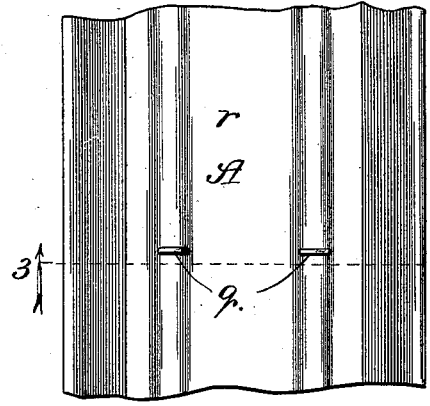

Referring to the accompanying drawings—Figure 1 shows my improvement by a cross-sectional view, the dotted portion of the representation indicating the body-portion of the tire-cover forced to one side to permit the insertion of the stay-wire. Fig. 2 is a similar view, showing the tire-cover separate from the rim. Fig. 3 shows the rim in cross-section, the section being taken at the line 3 on Fig. 5 and viewed in the direction of the arrow. Fig. 4 is a broken plan view of the device as presented by the dotted representation in Fig. 1. Fig. 5 is a broken plan view of the rim as represented in Fig. 2.

A denotes the rim of a bicycle-wheel, formed preferably of wood, and provided with a circumferential groove $r$ affording a seat for the tire. At each side of the center of the seat $r$, there extends about the same a series of loops or eyes $q$ which project outward beyond the base of the groove.

B is the tire-cover, of any suitable material or materials, that shown being formed of layers of rubber and canvas vulcanized together; and along the edges it is provided with flanges $p$ and $p'$, which are best formed thereon by molding, being preferably of the same material or materials composing the body of the cover. In the flanges I also prefer to form, to extend lengthwise of them, narrow grooves $o$, transversely of which, at intervals apart corresponding with those of placing the eyes $q$, are provided slots or openings $n$ extending through the flanges to coincide with the eyes on which the flanges are "buttoned," as it were, by causing the eyes $q$ to protrude through the slots $n$. To fasten the cover separably in place in the seat $r$ a stay-wire $m$ is run or laced through the protruding portion of each series of the eyes over the respective flange in the groove $o$ therein, in which the wire is thus countersunk to enable the eyes to project as little as possible beyond the surface of the flange. Inasmuch, however, as the eyes project somewhat beyond the flange-surfaces, in order to prevent or reduce their wear on the adjacent surfaces of the body-portion or tubular portion $l$ of the cover which bears against them, I provide in opposite sides of the body-portion, lengthwise thereof, grooves $k$, with which the eyes coincide when the tubular portion is distended against the seat.

It is obvious that instead of wire as the medium for fastening the tire-cover at its flanges, a more flexible material, such as a lace, may be employed; and the cross-sectional shape of the medium used is a matter of indifference.

What I claim as new, and desire to secure by Letters Patent, is—

In combination, a wheel-rim A provided with a circumferential groove $r$ having eyes $q$, a tire-cover B formed with edge-flanges $p$ and $p'$ containing openings $n$ which engage the loops and provided with grooves $o$, grooves $k$ in the body-portion of the cover and stay-wires $m$, or the like, run through the eyes at the grooves $o$, substantially as described.

BERTRAM G. WORK.

In presence of—
P. W. LEAVITT,
W. J. O'NEIL.